United States Patent [19]

Giacomini

[11] Patent Number: 5,031,876
[45] Date of Patent: Jul. 16, 1991

[54] COCK WITH BALL-SHAPED STOPPER

[75] Inventor: Marco Giacomini, Boleto, Italy

[73] Assignee: Siro, S.p.A., Milan, Italy

[21] Appl. No.: 584,367

[22] Filed: Sep. 17, 1990

Related U.S. Application Data

[63] Continuation of Ser. No. 395,148, Aug. 16, 1989, abandoned, which is a continuation of Ser. No. 211,375, Jun. 24, 1988, abandoned.

[30] Foreign Application Priority Data

Jun. 30, 1987 [IT] Italy .............................. 21129 A/87

[51] Int. Cl.⁵ .............................................. F16K 5/06
[52] U.S. Cl. ..................................... 251/312; 251/314
[58] Field of Search ............... 251/310, 312, 314, 358, 251/315; 137/375

[56] References Cited

U.S. PATENT DOCUMENTS

| | | | |
|---|---|---|---|
| 3,157,382 | 11/1964 | Perry | 251/315 X |
| 3,334,650 | 8/1967 | Lowrey et al. | 251/315 X |
| 3,450,151 | 6/1969 | Hurzenroeder | 251/315 X |
| 3,951,380 | 4/1976 | Oliva-Bonino | 251/312 X |
| 4,441,524 | 4/1984 | Mese | 251/315 X |
| 4,488,573 | 12/1984 | Ringom | 251/315 X |
| 4,778,152 | 10/1988 | Logman | 251/310 X |
| 4,809,949 | 3/1989 | Rahieshi | 251/312 X |

FOREIGN PATENT DOCUMENTS 2037952 9/1980 United Kingdom .

Primary Examiner—John C. Fox
Attorney, Agent, or Firm—Woodcock Washburn Kurtz Mackiewicz & Norris

[57] ABSTRACT

An improved valve with ball-shaped stopper, comprising a valve housing in which the stopper forms a seal with two faces developing in parallel planes opposite each other and in which the ball-shaped stopper, the stopper handle and the control rod connecting them are formed in a single rigid piece. The stopper component is provided, on the stopper and on the part of the control rod adjacent to it, with a coating of a sealant which forms the seal toward the outside of the valve preventing fluid from leaking, and also forms the seal within the valve which regulates fluid flow.

6 Claims, 5 Drawing Sheets

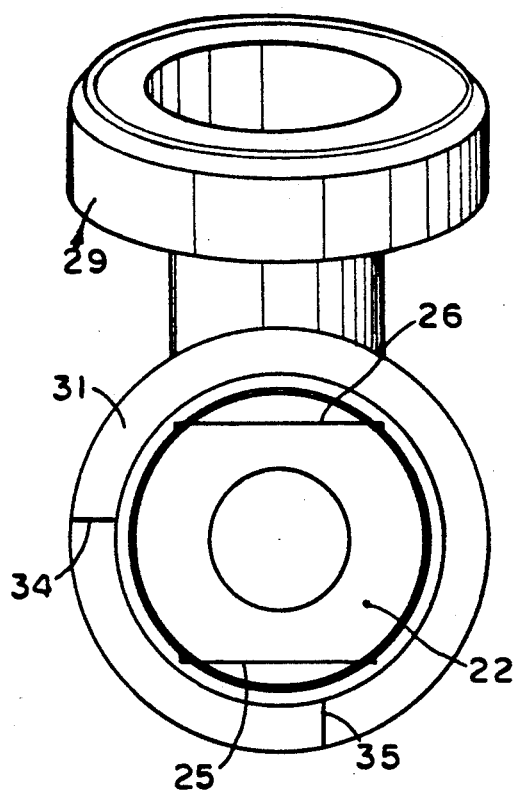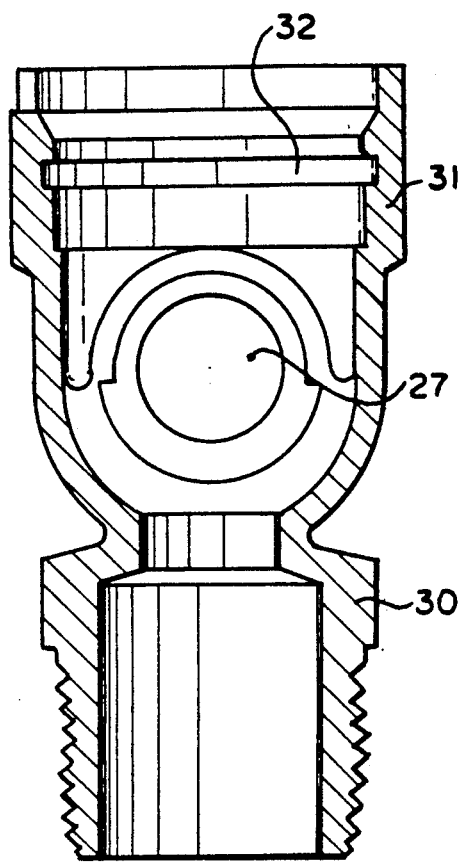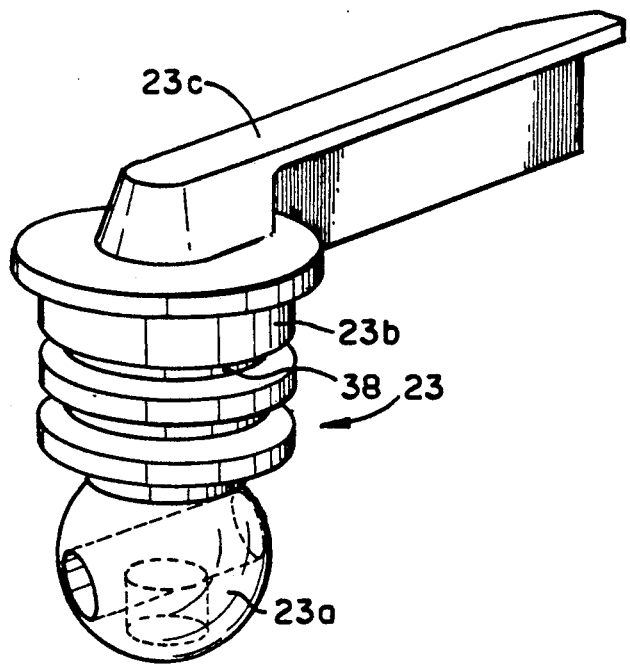

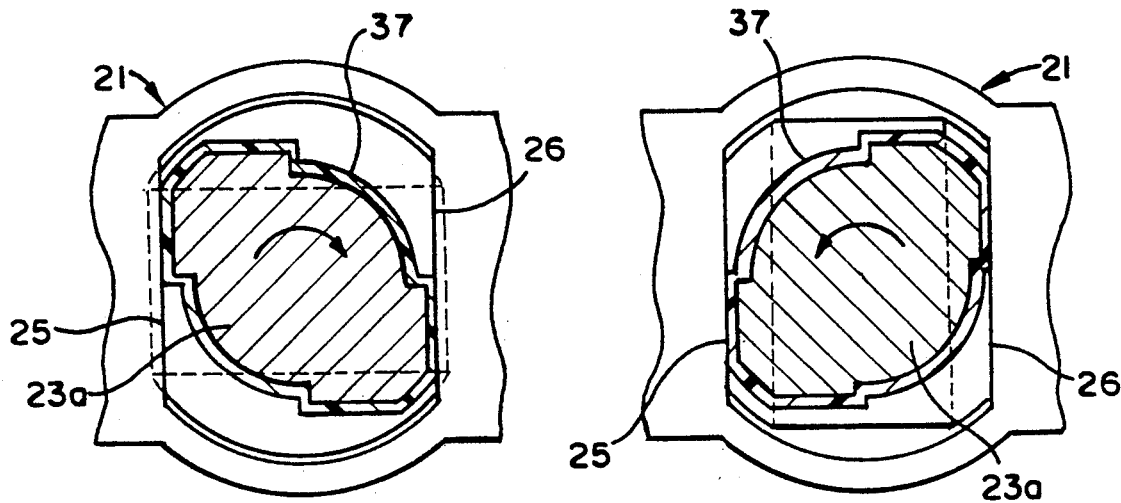
FIG. 12b  FIG. 12a
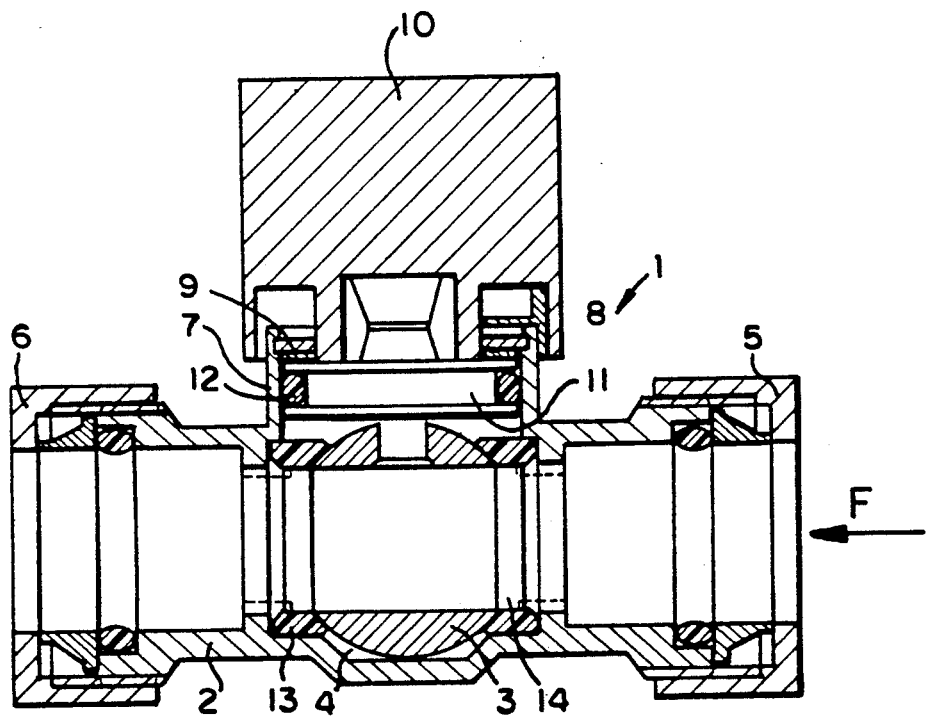
FIG. 13
PRIOR ART

COCK WITH BALL-SHAPED STOPPER

This is a continuation, of application Ser. No. 395,148, filed Aug. 16, 1989; which was a continuation of Ser. No. 211,375, filed on June 24, 1988 now abandoned.

BACKGROUND OF THE INVENTION

The present invention refers to an improved valve with a ball-shaped stopper. More particularly, the present invention provides a single-piece stopper coated with a sealing material.

Valves with ball-shaped stoppers are presently known in various forms, which are mainly differentiated by the fact that the valve body is in one or more parts. Although the present invention refers to valves having ball-shaped stoppers in general, included in this designation as well are similar valves, such as gate valves and the like with ball stoppers. The present invention provides particularly significant advantages in valves having a single piece body. A valve of this type was disclosed by Italian Patent No. 1,101,585. The body of this valve disclosed therein features a housing for the ball-shaped stopper, a fluid inlet connection, a fluid outlet connection, and a hollow neck portion to permit the insertion of the stopper into the housing. The disclosed valve is also designed to accept the control rod which is connected to the ball, a seal is formed between the housing and the control rod by a flexible ring. The latter is housed in a circumferential groove on the internal surface of the neck portion. A handle, lever or similar device is connected to the control rod to permit the opening and closing movements of the ball stopper to be performed. The housing of the stopper in the valve body is provided with two opposite seats for two gaskets, between which the ball stopper forms a seal. The seal which prevents fluid from escaping toward the outside is provided by an O-ring disposed in a seat formed in the control rod and in a sealing relationship with the internal surface of the neck portion. The ball stopper disclosed has a seat for retaining a part of the control rod, which is also connected to the activation handle or lever by a screw.

Therefore, known ball-stopper valves require a large number of components, a variety of processing steps and three sealing gaskets. To diminish the friction between the stopper and the gaskets, the stopper is typically manufactured with a high degree of precision on its outer surface and subsequently plated with chrome. Also, the assembly of such known valves requires a number of individual assembly steps, which cannot all be readily conducted in an automated fashion.

In known embodiments of valves with a multiple part valve housing an even higher number of components is necessary, as a result of which the expenditure of time both for construction and assembly is even greater than that for ball valves with a housing in a single piece.

Although providing an unobjectionable operation and good seals, ball valves of the type described above thus have the disadvantage of requiring a large number of components, numerous manufacturing steps and a complex assembly procedure requiring an equivalent amount of time. This necessarily results in relatively high production costs.

SUMMARY OF THE INVENTION

The present invention provides a valve of the type having a ball-shaped stopper which maintains a great reliability of operation and sealing power, while requiring a drastically reduced number of components resulting in a considerable simplification in the production and manufacturing phases. The valve assembly disclosed may be assembled in a brief time and in an automated manner.

Included within the scope of the present invention is also the object of creating ball stopper valves which provide satisfactory operation and sealing performance and can be produced at greatly contained costs.

A further object of the present invention is providing a ball stopper valve occupying—with equivalent ball stopper dimensions—a smaller space than the ball stopper valves of the prior art.

These and other objects of the present invention are resolved by a valve featuring a substantially ball-shaped stopper, adjustable between open and closed positions, for regulating fluid flow. The valve comprises a single-piece valve housing having two opposite parallel seat surfaces, flow inlet and outlet connections, and a neck portion having position adjustment means for introducing and positioning the ball-shaped stopper relative to the body portion. Elastic means for positioning the stopper relative to the body portion are provided which act in cooperation with the position adjustment means. Finally, limit stop means provided for defining the end travel positions of the open and closed position of the stopper. The valves of the present invention also comprise a control portion formed of a single rigid piece, insertable and removable from the body portion as an integral assembly. The control portion comprises the substantially ball-shaped stopper, a portion of which is coated with a sealant material for cooperating directly with the body to form a liquid tight connection between said ball-shaped stopper and the body portion, a handgrip means for controlling the position of the stopper, and a control rod connecting the handgrip and the stopper, which is also coated with sealant material for cooperating directly with the body to form a liquid tight connection between the control rod and the body portion. By providing this integral, coated component, the parallel seat surfaces of the valve housing form flat internal seats which cooperate with the sealant material affixed to the ball-shaped stopper to form a liquid tight connection to regulate fluid flow. Valves made in accordance with the present invention may be comprised of metal or plastic materials, or the control portion may be a composite structure, with the ball-shaped stopper comprised of a plastic material. In certain embodiments the neck portion of the valve housing has a circumferential groove disposed upon the internal surface of the neck. Most preferably the neck portion further comprises an access slot for communication between the circumferential groove and the exterior surface of the housing.

The ball-shaped stopper of the valves according to the invention provide numerous advantages, the salient ones being the following:

a. Having in practice combined in a single piece the stopper control handle, the control rod and the ball stopper itself, the manufacturing of these parts is considerably simplified, since the single piece stopper component can now be simply produced by stamping the metal, plastic material and rubber in a single piece or as a rigid composite medium. The stopper component produced in the embodiment using metal components can then be made of lighter weight in such a way as to reduce the amount of material used.

b. The production of the stopper is also simplified, since it is no longer necessary to have a smooth finish applied to the outer surface of the ball, with subsequent chrome coating such as in the case where the ball is formed of a metal.

c. The overall assembly of the valve is simplified considerably, not only by the drastic reduction of the components, but also by the elimination of the three gaskets previously necessary.

d. The application of sealing material directly to the stopper component of metal or plastic material may be advantageously performed without any problem according to the known procedures. The anchoring of the sealing material is satisfactory, due to the pairing of form between coating material and stopper component disclosed herein, since the profile of the parts to be coated is shaped with various projections and indentations.

e. The embodiment of the present invention wherein the ball is comprised of rubber maximal structural simplicity.

f. The seal obtained with the stopper component disclosed herein is produced between the sealing material on the stopper component and points provided in the body of the valve. A seal is also formed sealing material shaped in the form of a toroidal gasket with profiled external shape, e.g., rounded double-ring, multiple rim, labyrinth type, and the body of the valve. The gasket being preferably engaged directly with the internal surface of the neck portion of the valve body. This results in a satisfactory seal while providing considerable structural simplification.

g. The stopper component of the present invention can be advantageously obtained either as a single piece stamped in metal or plastic material, or as a composite component with one portion of the stopper made of metal, strongly anchored to form a single-piece construction, advantageously by setting in a portion of rubber plus a handle of plastic material. In all of the embodiments possible lightenings of the structure as desired are of course possible.

h. The assembly process of the valve of the present invention is reduced in practice to a single step of inserting the stopper into the valve housing, pairing the position-adjustment means between the said two parts during the same step.

i. In the case where the stopper element is built with a position-adjustment groove, these position-adjustment means serve as a simple open and elastic annular element. In contrast, in the case of stopper elements where the upper part is comprised of plastic material, the position-adjustment means are manufactured as an integral part, the stopper component as a portion emerging therefrom. In any case, the position-adjustment means provided are engaged in an annular groove formed on the inside of the neck portion of the valve housing.

j. In addition to the advantages concerning the construction and assembly simplification, yet another advantage that is obtained lies in the lowering of the production costs, as a result of which, indirectly, the valves according to the invention can now be utilized in applications for which the ball stopper valves of the prior art were too expensive.

k. Yet another advantage o the valves of the present invention is seen in the possibility of reducing the space that they occupy.

Further details and structural characteristics of the valves according to the present invention will be given below in the following description with reference to the attached drawings in which several preferred embodiments of the valves of the present invention are illustrated, provided only by way of indication and not limited to these forms.

BRIEF DESCRIPTION OF THE DRAWINGS

The schematic representations shown in the drawings are as follows:

FIG. 3 is a top view of the single valve housing of FIGS. 1 and 2, with the stopper removed;

FIG. 4 is a middle cross-section of the single valve housing taken through plane IV—IV in FIG. 2;

FIG. 5 is a view in perspective of the ball stopper component of the embodiment according to FIGS. 1 and 2, as a stamped piece;

FIG. 12a and 12b are two partial sections in the XII—XII plane as shown in FIG. 1, but are illustrated in a valve with rectilinear body and a stopper component according to FIG. 11, FIG. 12a showing the closing position, and FIG. 12b showing the opening position;

FIG. 13 is a middle longitudinal section through a valve with a rectilinear body and a ball-shaped stopper of the known type.

DESCRIPTION OF THE PREFERRED EMBODIMENTS

Figure 1:
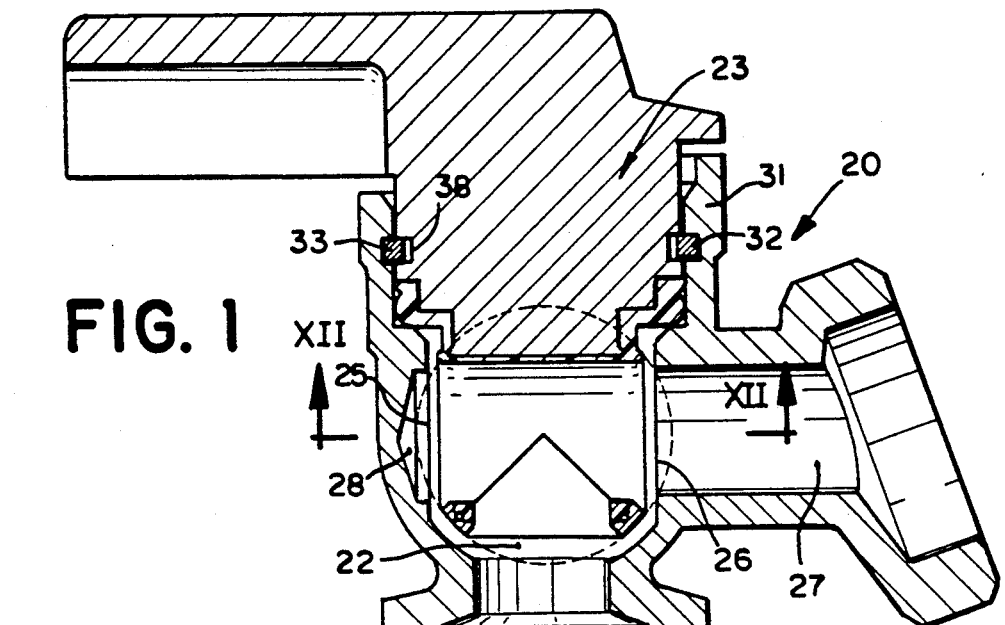
FIG. 1 is a middle vertical section through a ball stopper valve according to the invention, in open position.

Reference is first made to FIG. 13, illustrating a ball valve of the prior art. In FIG. 13, the entire valve 1 which comprises a valve housing 2 and a ball stopper 3 is illustrated. In the valve housing 2 the housing seat of stopper 3 is indicated as 4, while 5 and 6 designate the inlet connection and outlet connection of the fluid, flowing in the direction of arrow F. The neck portion 7, which accommodates the annular groove 8 housing a Seeger ring 9 or similar component for the position adjustment of the stopper 3. The stopper 3 is controlled by a handle 10 and an intermediate control rod 11. This houses an 0-ring gasket 12, providing the seal preventing the fluid from escaping toward the outside. The stopper 3 is tightly closed between two other gaskets 13, 14, housed in corresponding seats provided in valve housing 2. At this point the basic structure of the valves of the prior art which have been described is one with the valve housing 2 in a single piece.

Reference is now made to the embodiments of the present invention, illustrated in FIGS. 1–12, illustrated for ease of comprehension in different scales in which equivalent parts are indicated with the same reference numbers.

The valve considered as the whole is indicated by 20 in FIG. 1. This valve assembly 20 includes a valve housing 21 (FIG. 2), which has a construction similar to the valves of the prior art. Two flat seats 25 and 26, opposite and parallel, are found in the lower section of the housing 22 of the ball stopper component 23, which will be examined below. Also illustrated are the fluid passage hole 27, and the seat formation hole 28 in the particular case of rubber ball stoppers 23 as illustrated. The formation of sealing edges 27a and 28a are defined with which the sealing material applied to the ball stopper 23 according to the invention cooperates is further reviewed below.

Also illustrated in the valve housing 21 are the fluid outlet connection 29, the fluid inlet connection 30, the neck portion 31, the circumferential groove 32 in which an elastic positioning ring 33 is disposed, as well as meeting points 34 and 35 determining the end pOints of the movement of the stopper component 23.

Referring now to FIG. 5, the stopper component 23 comprises in a single piece, e.g., as a stamped element of metal and/or plastic material and/or rubber, the ball stopper itself 23a, the control rod 23b and the handgrip element 23c, which may be of any conformation, for example a handle, a lever as illustrated, and so on. According to the embodiment illustrated in FIG. 7 the stopper component 23 may likewise comprise a rigid, composite piece made of a ball element 23a of metal or rubber, solidly anchored, e.g., by setting it in, and an additional part of plastic material, including the rod or cylinder portion 23b and the handgrip portion 23c.

Figure 2:
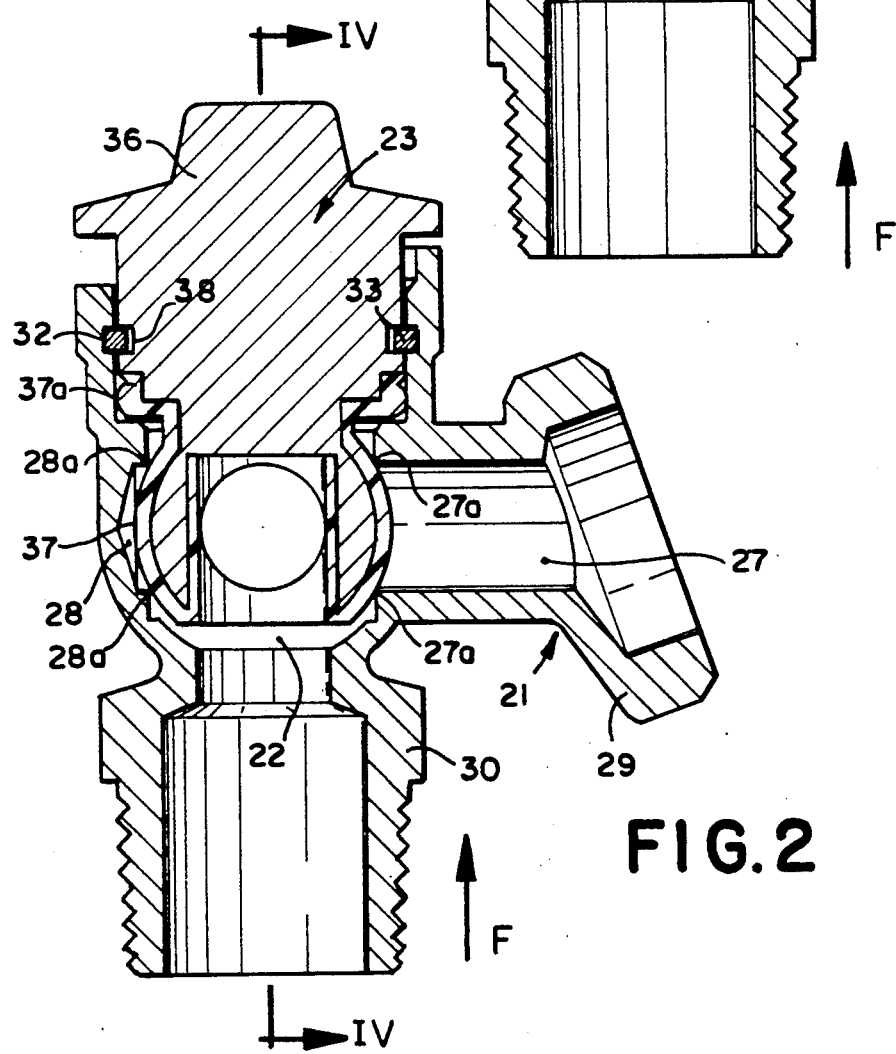
FIG. 2 is a similar middle vertical section through the ball valve of FIG. 1, but with the ball stopper component rotated by 90° as compared to FIG. 1, in the closed position.
Figures 6, 7:
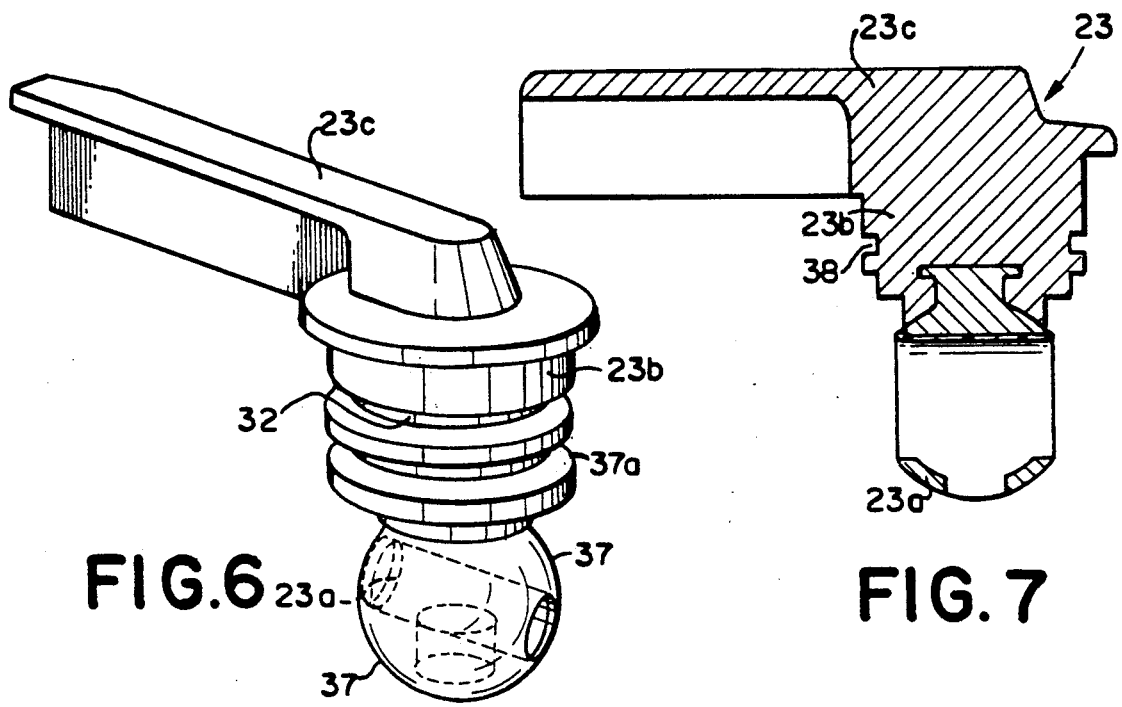
FIG. 6 is the same stopper component as FIG. 5, equipped with a sealing material coating.
FIG. 7 is a middle longitudinal section through a stopper component according to the invention in a variant of the embodiment, in which the stopper part is made of plastic material to be coated with rubber, or directly of rubber.
Figure 11:
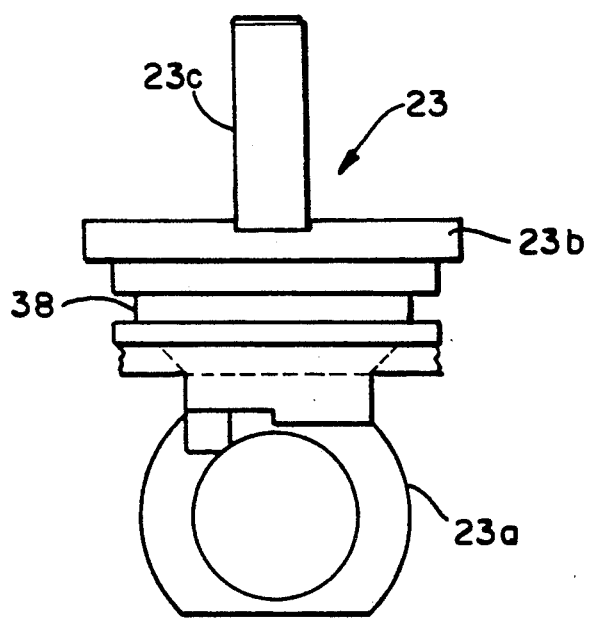
FIG. 11 is a front view on a stopper component with internal meeting points of opening and closing limit travel.

In the present invention the three separate sealing gaskets hitherto necessary to guarantee both the seal toward the outside and to provide a seal around the ball stopper 23a are replaced by the direct application of sealing material, for example, rubber, to the stopper component 23, and more particularly to the external surface of the ball stopper 23a and to a portion of the control rod 23b, now becoming a shank adjacent to the ball stopper 23a. This sealing material is indicated by a dark shading on the drawings. This indication is given purely by way of illustration and, for the purpose of easier comprehension does not take real dimensions into consideration. The entire coating as a whole is indicated by 37a, with it being possible for this to have an essentially circular external contour, as illustrated in FIG. 1 and 2, or a double ring contour, as indicated in FIG. 6, or even a multiple rim contour, as illustrated in FIG. 11, or any other suitable profile. The application of the sealing material 37a to the stopper component 23 may be achieved by using any suitable procedure. The solid anchoring of the sealing material 37a is guaranteed both by the distinctive features of the methods of application themselves, and by the geometric use of the sealing material on a contoured support, as easily noted from the drawings.

Figures 8, 8A, 8B:
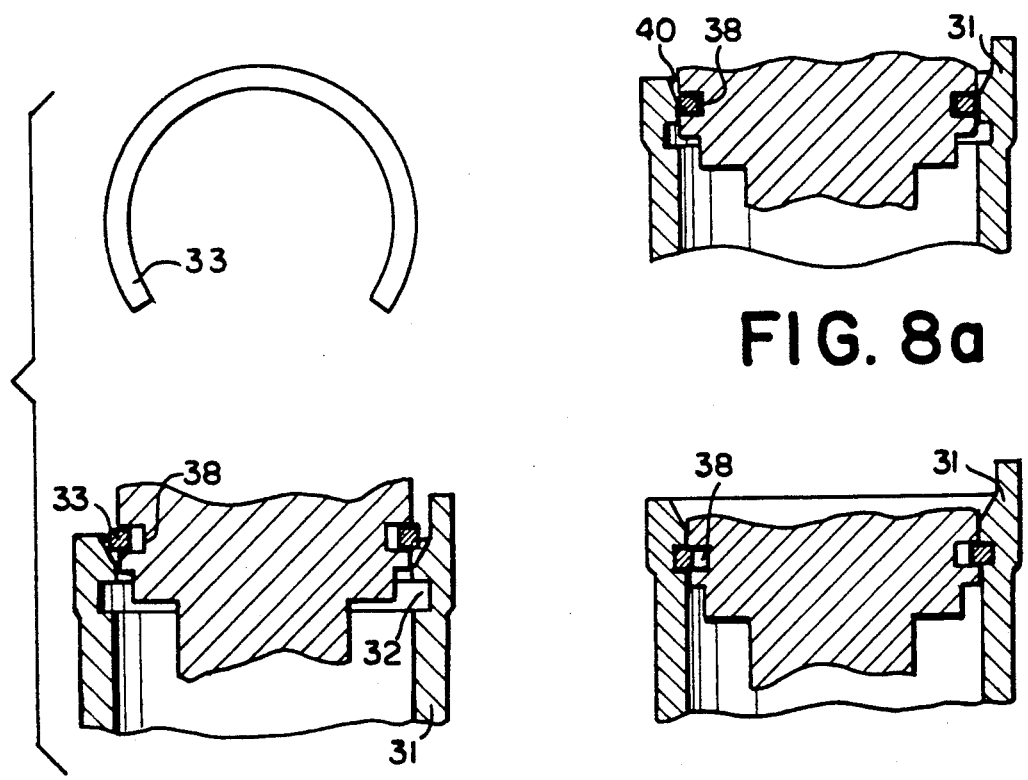
FIGS. 8, 8a and 8b are three detailed views through the middle section in the neck portion area of the valve housing, indicating the various phases of application of a positioning ring.
Figure 9:
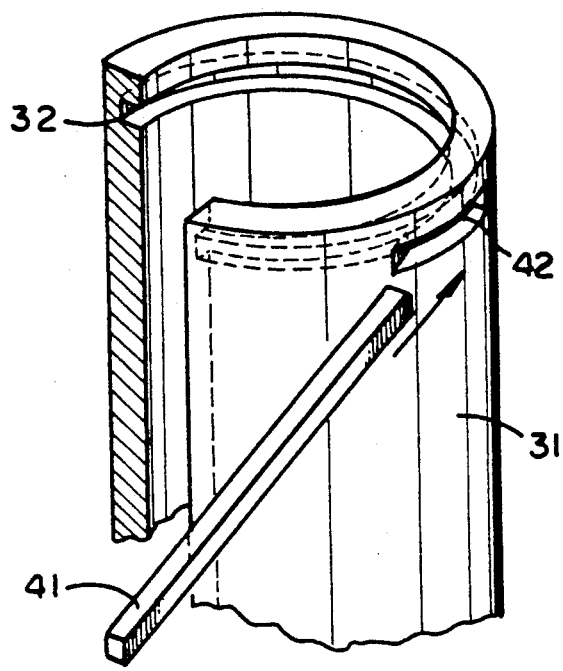
FIG. 9 is a partial external view of a valve according to the invention, illustrating a first exemplified variant of application of the positioning ring.

The stopper component 23 is comprised of a single piece of rubber or of a ball part 23a and/or adjacent annular seal portion of rubber. These parts may be obtained by molding with the traditional methods. The shank part 23b and/or the handgrip part 23c will be able to contain inserts, not illustrated. As regards the assembly of the two individual parts the housing 21 and stopper 23 now forming the valve according to the invention, the use of any suitable means is possible. Particularly advantageous are the solutions described below. In reference to FIG. 8–8b a first exemplified embodiment is illustrated, in which in the shank part 23b, a groove 38 are provided for retaining an open ring 33, which can be formed of material having a springy or resilient feature in opening. The phases illustrated are self-explanatory. In FIG. 8 the ring 33, illustrated in quadrangular section by a more precise axial positioning of the stopper component 23, is partially inserted in groove 38 and, pushing the stopper element 23 downward, through the inclined plane 40 provided as an annular flare on the neck 31, brings about the progressive insertion of ring 33 in the groove 38 until, having reached the position shown in FIG. 8b, the ring 33 expands by means of its own elasticity and enters a groove 32 in the neck 31. In the example in FIG. 9 a tangential insertion of a continuous filament element 41 is proposed as a variant. This element, like ring 33, besides being of metal may consist of a metallic core with a coating of rubber or similar material. In the neck 31 a tangential slot 42 is provided formed at the height of the internal groove 32. In this way, following insertion of the stopper component 23, and its positioning in the cock body 21 in such a way that the groove 38 of the stopper component 23 is found in the same plane of the groove 32 of neck part 31, it will be possible to insert the filament 41 through the slotting 42. The filament 41 will then follow the coplanar development of the chamber formed by the two grooves 32, 38. After insertion of a portion of filament 41 somewhat higher than the semicircumference of the grooves 32, 38 the filament 41 will be cut on the outside and inserted permanently by means of a punch, with the punch and cutting device not being part of the present invention. The portion of filament 41 inserted is adapted in shape to the open ring; therefore in grooves 38 and 32 it guarantees the same reliability of positioning as the ring 33 considered previously.

Figure 10:
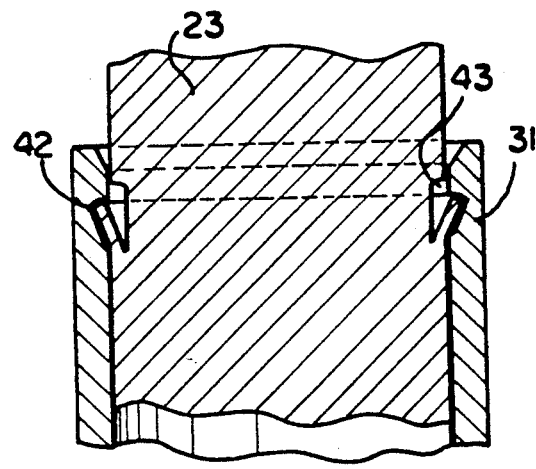
FIG. 10 is a detail through the middle section in the neck portion area, illustrating an additional variant of the positioning means between the stopper component and the valve housing.

In the embodiments wherein the stopper component 23 is made completely of plastic material or of composite construction, it is worth mentioning that with a stopper part of metal and a rubber part and handgrip of plastic, it is distinctly possible to eliminate the ring positioning element and to use as a positioning element the same plastic material as the stopper component 23, as illustrated for example in FIG. 10. In this case it will be sufficient to provide protruding ring-shaped sectors 43 for interacting with the neck and, adjacent to these, a ring-shaped recess 44 to permit them to move slightly inwardly during the insertion of the ball component 23a in the valve body 21.

An additional improvement according to the present invention consists of reducing the space occupied by the proposed ball valve. Toward this purpose, portions of the same flat internal seats 25, 26 of the same valve housing 21 are used as mechanical locks at the meeting points defining the end travel positions of the opening and closing movement of the stopper component 23; cooperating with these portions are protrusions 45 produced in a single piece on the stopper component 23, as shown in FIGS. 11, 12a and 12b. According to the sealant coating method selected, these protrusions 45 may or may not be coated with the same material.

Based on what has been described above it can be seen that the ball-shaped stopper valve according to the invention effectively resolves the objects set above and the various important advantages mentioned above are achieved, pertaining both to simplification of construction and to speed of assembly, and to a more contained area of space occupied. With the same stopper component it is possible to advantageously use the different types of valve housings ordinarily supplied, e.g., square-shaped, rectilinear.

All of the individual parts can be replaced by other technically and/or functionally equivalent parts, without going beyond the scope of the present invention. For example, in the stopper component, or in the ball part itself, it is possible to provide a roughened external surface, or small perforations or cavities for facilitating and improving the anchoring of the sealant layer or, particularly in the case of large-sized valves, to replace portion 37a forming a seal toward the outside with a traditional O-ring, as well as to give the portion forming a seal toward the outside labyrinth contour, or flexible rims and so on, and also to provide the other positioning means without similarly abandoning the scope of the present invention. The selection of sealant material is not limited, nor is the form of possible housing seats for the sealant on the ball, nor the various thicknesses of the sealant layer, which may also vary depending on the size of the cock considered.

The guidelines of the present invention can obviously also be applied to all the various components pertaining to taps, pipe fittings, valves and similar items using stoppers or rotating bodies functionally equivalent to the ball stoppers described above. Also falling within the scope of the present invention is the use of the said stoppers or rotatable bodies provided with a sealant coating anchored directly therein, or themselves made of rubber or similar sealant materials, which are controlled indirectly, or do not form a single piece with the related activation or control parts.

All the characteristics disclosed by the description, by the claims and by the drawings are to be considered in connection with the present invention, either individually or in combination with each other, according to the case.

I claim:

1. In a valve having a substantially ball-shaped stopper, adjustable between an open position and a closed position, for regulating fluid flow comprising:
   (a) a single-piece valve housing having two opposite parallel seat surfaces, flow inlet and outlet connections, and a neck portion having position adjustment means for introducing and positioning the ball-shaped stopper relative to the body portion;
   (b) elastic means for positioning the stopper relative to the body portion in cooperation with said position adjustment means; and
   (c) limit stop means for defining the end travel positions of the open and closed position of the stopper, the improvement comprising:
   (d) a control portion formed of a single rigid piece, insertable and removable from the body portion as an integral assembly, said control portion comprising:
      (i) said substantially ball-shaped stopper, at least a portion of which is coated with a sealant material for cooperating directly with the body to form a liquid tight connection between said ball-shaped stopper and the body portion;
      (ii) a handgrip means for controlling the position of the stopper; and
      (iii) a control rod disposed between the handgrip and the stopper, at least a portion of which is coated with a layer of sealant material for cooperating directly with the body to form a liquid tight connection between the control rod and the body portion,
   whereby said parallel seat surfaces of the valve housing form flat internal seats which cooperate with the sealant material affixed to the ball-shaped stopper to form a liquid tight connection to regulate fluid flow.

2. The valve of claim 1, wherein the control portion is comprised of a metal.

3. The valve of claim 1, wherein the control portion is a integral composite structure and the ball-shaped stopper portion of the control portion is comprised of a plastic material.

4. The valve of claim 1, wherein the neck portion further comprises a circumferential groove disposed upon the internal surface of the neck.

5. The valve of claim 4, wherein the neck portion further comprises an access slot for communication between the circumferential groove and the exterior surface of the housing.

6. A valve according to claim 1, wherein said position adjusting means comprises a circumferential groove.

* * * * *